US008965376B2

(12) United States Patent
Hoole

(10) Patent No.: US 8,965,376 B2
(45) Date of Patent: *Feb. 24, 2015

(54) SYSTEMS AND METHODS FOR ASSIGNING REGIONAL WIRELESS COMMUNICATIONS HANDOVERS UTILIZING ANCILLARY CELL FEEDBACK

(71) Applicant: Eden Rock Communications, LLC, Bothell, WA (US)

(72) Inventor: Elliott Hoole, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,143

(22) Filed: Jul. 3, 2014

(65) Prior Publication Data

US 2014/0315553 A1    Oct. 23, 2014

Related U.S. Application Data

(63) Continuation of application No. 12/702,870, filed on Feb. 9, 2010, now Pat. No. 8,811,992.

(60) Provisional application No. 61/155,110, filed on Feb. 24, 2009.

(51) Int. Cl.
*H04W 36/00* (2009.01)
*H04W 36/30* (2009.01)

(52) U.S. Cl.
CPC ................................. *H04W 36/30* (2013.01)
USPC ........... 455/436; 455/438; 455/458; 370/331; 370/335

(58) Field of Classification Search
USPC .......... 455/436, 458, 438, 515, 434; 370/331, 370/335, 397, 401, 396, 389, 410; 709/223, 709/237, 236, 249; 379/229, 196, 220.01
See application file for complete search history.

(56) References Cited

U.S. PATENT DOCUMENTS

| 8,023,469 B2 * | 9/2011 | Sachs et al. ................... 370/331 |
| 2002/0122396 A1 * | 9/2002 | Terasawa ...................... 370/331 |
| 2003/0040331 A1 * | 2/2003 | Zhao ............................ 455/552 |
| 2007/0025296 A1 * | 2/2007 | Jung et al. .................... 370/331 |
| 2007/0105568 A1 * | 5/2007 | Nylander et al. ............. 455/458 |
| 2007/0213086 A1 * | 9/2007 | Claussen et al. ............. 455/513 |
| 2009/0097451 A1 * | 4/2009 | Gogic ........................... 370/331 |
| 2009/0129341 A1 * | 5/2009 | Balasubramanian et al. 370/331 |
| 2009/0310559 A1 * | 12/2009 | Chen et al. .................... 370/331 |

* cited by examiner

*Primary Examiner* — Mahendra Patel

(57) ABSTRACT

A networked computing system for assigning regional wireless communications based on ancillary device feedback. The network computing system includes a radio communications controller, one or more transceiver device(s), user equipment, and data communications network facilitating data communications amongst the wireless communications devices of the networked computing system. The radio communications controller may be configured to receive a feedback communication from a network transceiver device capable of detecting ancillary wireless communications, and then determine whether an alternate service provider resource exists for providing wireless data communications service to the user equipment within the data communications network, based on the received feedback communication.

16 Claims, 11 Drawing Sheets

SYSTEMS AND METHODS FOR ASSIGNING REGIONAL WIRELESS COMMUNICATIONS HANDOVERS UTILIZING ANCILLARY CELL FEEDBACK

CROSS REFERENCE TO RELATED APPLICATIONS

The present application claims priority to and is a continuation of U.S. Non-provisional application Ser. No. 12/702,870, filed Feb. 9, 2010, which claims the benefit of U.S. Provisional Application No. 61/155,110, filed Feb. 24, 2009.

FIELD OF THE INVENTION

The field of the present invention generally relates to systems and methods for determining and delegating wireless communications service assignments based on distributed cell feedback. These assignments generally relate to network handovers in a cellular wireless communications network. In particular, feedback-based selections allow a particular service provider to control its network resources, such that its network services can be self-optimized in real time communications scenarios.

BACKGROUND OF THE INVENTION

Today, an increasing number of readily deployable wireless transceiver devices (e.g., femtocell and picocell base stations), operating on licensed frequency spectra, are being utilized by network subscribers within the coverage areas of larger wireless network cells (e.g., macrocell and microcell base stations) to improve the quality and/or capacity of wireless communications for various subscriber site locations. Smaller cells play an increasingly significant role in reducing metropolitan and residential area traffic experienced by larger, often overburdened, network cells. These transceiver devices may be distributed in such a way as to provide short-range wireless communications services to single-family homes, public businesses (e.g., such as Starbucks® coffee shops or McDonalds® restaurants), to particular floors within an office building, or any other public or private entity location desiring improved and/or localized cellular service.

As would be understood by those skilled in the Art, in wireless service provider networks, macrocells typically provide the largest wireless coverage area for licensed frequency spectra, followed by microcells, then picocells, and lastly femtocells, which provide the smallest coverage area of the common network cell types. By way of example, in a typical wireless data communications network, a macrocell base station may provide a wireless coverage area ranging between one to five kilometers, radially from the center of the cell; a microcell base station may provide a coverage area ranging between one-half to one kilometer radially; a picocell base station may provide a coverage area ranging between 100 to 500 meters radially; and a femtocell base station may provide a coverage area of less than 100 meters radially. Each of these network cell or base station types is generally configured to connect with a particular service provider network using various common wireline communications technologies, including, but not limited to: fiber optic, DSL, powerline, and/or coaxial cable (joining cells to a backhaul network).

It is anticipated that with the evolution of next generation wireless communications (e.g., with 4G wireless communications deployment), smaller cells (also referred to herein as "transceiver devices") may eventually be the predominant service providing instruments utilized in most heavily populated geographic regions of a wireless network. In this developing scenario, groups of smaller cells may be collectively viewed as "layers" of cells that supply the lion's share of a particular service provider's network capacity, whereas the network's larger cells may be primarily responsible for providing overarching coverage to the underlying intra-network of smaller cells, in order to facilitate service continuity between smaller cells and amongst cells and cell layers. For example, as a mobile subscriber geographically moves amongst various network sectors, an overarching macrocell may be responsible for filling in any service gaps existing between and amongst various regional microcells, picocells and femtocells that may temporarily provide regional communications service to the travelling mobile subscriber.

Expanding modern network resources may include introducing many layers of smaller cells in highly populated regions of an existing network. This can reduce periods of network congestion created by necessarily bottle-necking a majority of regional subscriber communications through a small number of larger network cells (e.g., macrocells or microcells). This congestion reducing technique can improve a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be mitigated by adding a substantial number of short-range wireless transceiver devices to network infrastructure, may include: queuing delay, data loss, as well as blocking of new and existing network connections for certain network subscribers.

In traditional networks, where larger cells (e.g., macrocells or microcells) provide communications service to a majority of regional network subscribers, subscriber devices (also referred to herein as "user equipment") may be provided with a listing of all registered neighboring cells by a network service provider via communications with a larger cell. When subscriber devices are not in an active communications session (e.g., in idle mode), the subscriber device may be instructed to scan for all neighbor cells on the listing in their local area, such that the larger cell and/or a regional service provider controller can perform a service assignment and/or handover selections based on detected neighbor cells (e.g., cells in the service provider listing) that may be available to provide service to the subscriber device. In these traditional networks, larger cell planning consists of utilizing a grid where representative cells are placed, such that the network cells have common coverage boundaries with their neighboring cells. The number of neighbor cells for a given cell area is generally a fairly low number. The network infrastructure for many modern networks has been constructed utilizing this type of network planning scenario. As such, adding many new smaller cells to existing network topologies introduces new levels of complexity to wireless networks that were never anticipated in the original planning and deployment stages for many existing larger network cells.

As one example, with the addition of numerous smaller cells (e.g., picocells and femtocells) in a modern network (e.g., a 3GPP LTE network) there are likely to be many new cells added within the coverage areas of preexisting macrocells. As such, traditional macrocell based reselection mechanisms become very inefficient for proactively moving traffic off of a macrocell layer and on to smaller cell layers. Relying on neighbor cell lists to largely determine neighboring base station locations for network planning is not sufficient to provide a user equipment with adequate information for locating all available cells in their local area capable of providing communications service to them. There may be a significant number of residual neighboring cells in the region that are not on any service provider listing due to modern trends of ad-hoc smaller cell deployments by many network subscribers. Additionally, these residual cells may be too numerous for a user equipment to practically scan for and inform a regional macrocell or controller device about. It may take the user equipment an inordinate amount of time to scan through a lengthy list of cells and to scan for newly deployed cells (e.g., cells positioned via ad-hoc deployment) in order to allow a service provider entity to determine and assign a new, preferred serving cell for the user equipment.

Conversely, smaller cells with service provider listings of neighbor cells often have few cells on their respective neighbor listings, due to the fact that the majority of their neighbor cells typically only include a couple larger cells and a handful of smaller cells. Additionally, their smaller cell neighbors may be dynamically changing as local subscribers deploy residential or business site base stations in their area without necessarily registering their mobile cell location with their local service provider. In this scenario, service provider managed listings or regional base stations may be impractical to maintain and they may become obsolete as smaller cells are rapidly being deployed to support the increasing network bandwidth needs of network subscribers. Current mechanisms for service reselection are biased towards larger cells and away from smaller cells since subscriber mobility tends to more easily move connections to larger network layers.

Accordingly, as multi-layered networks (networks layered with many smaller cells) are rapidly being deployed to facilitate next generation wireless communications, there is an increasing need for improved systems and methods that facilitate a reassignment of the traditional task of detecting available intra-network resources for particular user equipment away from the actual user equipment and towards distributed, local service provider resources. This could effectively reduce, or eliminate altogether, the impractical burden on user equipment of needing to scan for all local service provider cells within their present geographic area capable of providing them with service. It would also efficiently shift various service handover tasks to network cells with previously untapped resources. As a result, wireless networks could achieve improved network QOS metrics and a network's collective users would benefit from improved QOE. It would also be beneficial if distributed service provider resources, employing these robust new systems and methods (e.g., smaller network cells), could autonomously function to detect, measure, and assign local user equipment communications. In this way, larger network cells and/or controllers could be relieved from having to collaborate with less reliable user equipment to procure regionally available network resource information.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with modern wireless data communications systems facilitating service handovers for mobile user equipment, the present invention discloses a networked computing system for assigning regional wireless communications based on ancillary device feedback. The computing system may include a radio communications controller, one or more transceiver device(s), user equipment, and a data communications network facilitating data communications amongst wireless communications devices of the networked computing system. In an embodiment, the radio communications controller may be configured to receive a feedback communication from a first transceiver device capable of detecting ancillary wireless communications, and then determine whether an alternate service provider resource exists for providing wireless data communications service to the user equipment within the data communications network, based on the received feedback communication.

In accordance with another aspect of the present invention, the radio communications controller may be configured to receive a feedback communication from a second transceiver device of the data communications network, and then determine whether the first transceiver device or the second transceiver device is a favored alternate service provider resource for providing wireless data communications service to the user equipment.

In accordance with a further aspect of the present invention, the feedback communication may comprise measured characteristics associated with an ancillary uplink data communications initiation signal transmitted from the user equipment.

In accordance with yet another aspect of the present invention, the feedback communication may comprise measured characteristics associated with an ancillary communications session between the user equipment and a network base station.

In accordance with yet a further aspect of the present invention, the radio communications controller may be configured to compare the feedback communication from the first transceiver device to network resource usage rules associated with a network service provider entity.

In accordance with another aspect of the present invention, the first transceiver device may be any of a microcell, a picocell, and a femtocell device, and the radio communications controller may be configured to assign the first transceiver device to provide wireless data communications service to the user equipment, based on the comparison of the feedback communication to the network resource usage rules.

In accordance with yet another aspect of the present invention, a computer-readable medium encoded with computer-executable instructions for assigning regional wireless communications based on ancillary device feedback, which when executed, performs the following processes: receiving a feedback communication from a first transceiver device capable of detecting ancillary wireless communications, and then determining whether an alternate service provider resource exists for providing wireless data communications service to a user equipment within a data communications network, based on the received feedback communication.

In accordance with a further aspect of the present invention, is a computer-implemented method for assigning regional wireless communications based on ancillary device feedback, the method includes at least the following steps: receiving a feedback communication from a first transceiver device capable of detecting ancillary wireless communications, and determining whether an alternate service provider resource exists for providing wireless data communications service to a user equipment within a data communications network, based on the received feedback communication.

In accordance with another aspect of the present invention, a radio communications controller device for assigning regional wireless communications based on ancillary device feedback, includes one or more memories, one or more processors, and a data communications component. The radio communications controller device may be configured to receive a feedback communication from a network communications device capable of detecting ancillary device communications, and then determine whether an alternate service provider resource exists within a data communications network for providing wireless data communications service to a user equipment, based on the received feedback communication.

In accordance with a further aspect of the invention, the radio communications controller may compare the feedback communication from the network communications device to network resource usage rules associated with a network service provider entity, and then assign the network communications device to provide wireless data communications service to the user equipment, based on the comparison of the feedback communication to the network resource usage rules.

BRIEF DESCRIPTION OF THE DRAWINGS

Preferred and alternative examples of the present invention are described in detail below with reference to the following Figure drawings.

DETAILED DESCRIPTION

Figure 1:
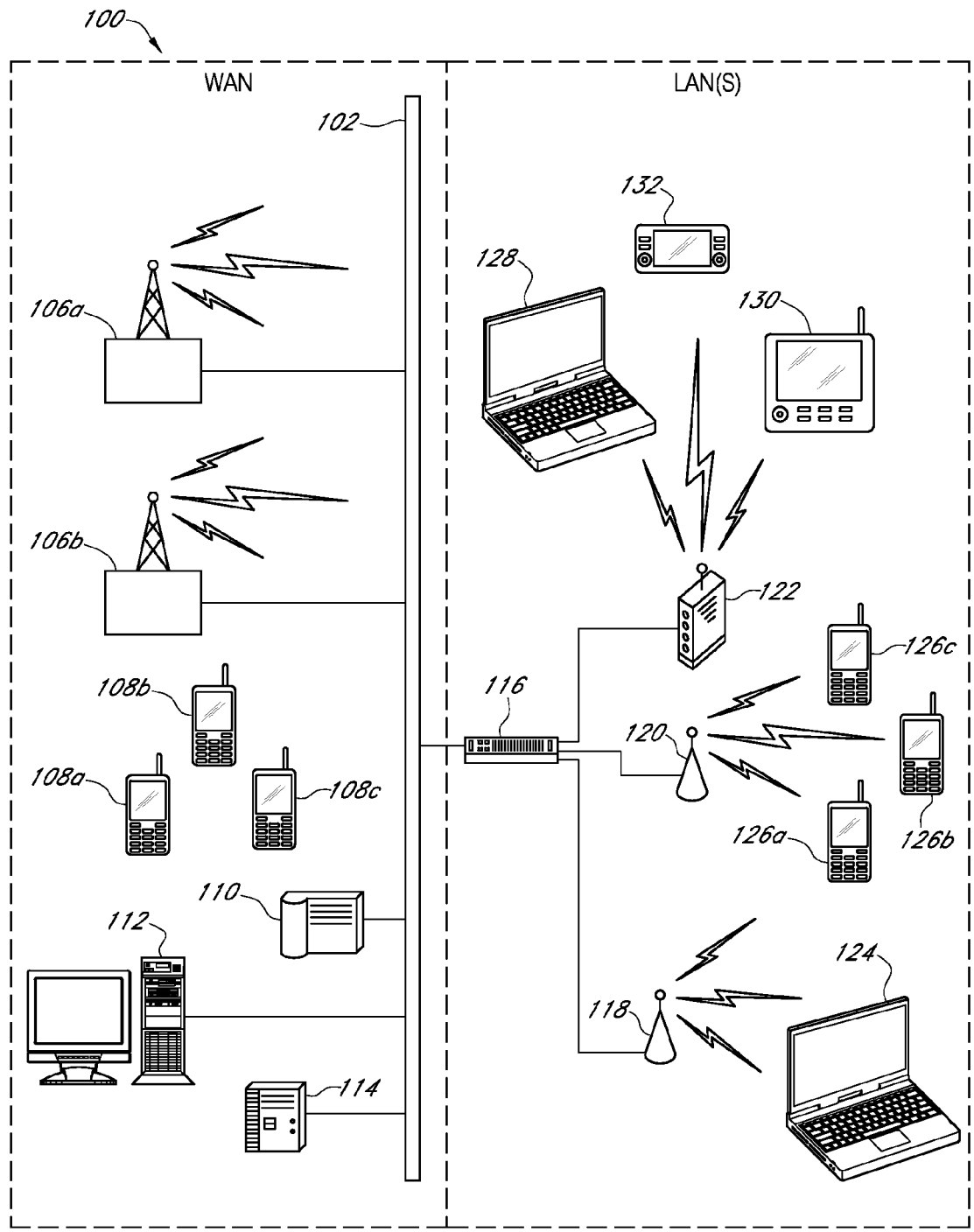
FIG. 1 illustrates a perspective view of a distributed data communications network in accordance with an embodiment of the present invention.

In accordance with an exemplary embodiment of the present invention, FIG. 1 illustrates a networked computing system 100 including various wireline and wireless computing devices that may be utilized to implement any of the ancillary communications detection, measurement, and assignment processes associated with various embodiments of the present invention. The networked computing system 100 may include, but is not limited to, a group of service provider controller devices (also referred to herein as "radio communications controllers") 110, 112, and 114; remote base stations 106a-b that may be associated with larger cells (e.g., macrocells and/or microcells that optionally may include radio communications controller functionality) and may be overarching and/or neighboring base stations to any of the other transceiver devices 118, 120, and 122 within a particular region of the networked computing system 100; multiple remote user equipment 108a-c (e.g., optionally including cell phones, PDAs, net books, electronic book devices, etc.) that may be provided service by any of the remote base stations 106a-b; a data communications network 102, including both Wide Area Network (WAN) and Local Area Network (LAN) portions; one or more network gateways, routers, or switch devices 110 that can facilitate data communications processes within the LAN and between the LAN and the WAN of the data communications network 102; local transceiver devices 118, 120, and 122 that may be associated with smaller cells (e.g., picocells and femtocells, and optionally microcells), that can provide wireless service to any number or type of local user equipment 124, 126a-c, 128, 130, and 132; and a variety of local wireless user equipment, including: a net book computer 124, a variety of cellular phone and/or PDA devices 126a-c, a laptop computer 128, an electronic book device 130, a handheld gaming unit 132, along with any other common portable wireless computing device well known in the art (e.g., personal music players, video recorders, tablets computers, etc.) that are capable of communicating with the data communications network 102 utilizing wireless services provided by one or more of the remote base stations 106a-b, transceiver devices 118, 120, and 122, or any other common wireless or wireline network communications technology.

Any of the service provider controller devices 110, 112, and 114, and remote base stations 106a-b may function, independently or collectively, as "radio communications controllers" in context with various embodiments of the present invention, as discussed further herein. At a very high level, a radio communications controller, may relate to any service provider device(s) capable of assigning and/or reassigning (e.g., via a network handover instruction to a particular user equipment) any network communications service tasks to various distributed service provider resources (e.g., to any of base stations/transceiver device 106a-b, 118, 120, and 122). For example, any of the service provider controller devices 110, 112, and 114 or a macrocell base station (e.g., base station 106b), acting as radio communications controllers, may instruct a picocell base station (e.g., either of transceiver devices 118 and 120) to provide wireless communications service to a net book computer 124, which was previously receiving its service from a macrocell 106b. This reassignment may occur when the controller device determines that the picocell is a favored serving cell for the net book 124, compared to the existing macrocell 106b, based on an analysis of at least the following criteria: available network resources, current network traffic conditions, and historical traffic trends for each of the cells. These criteria may be compared to a network controller's network usage rules in order to determine which cell (106b, 118, or 120) should provide service to the net book 124.

Without departing from the spirit and scope of the present invention, any of the ancillary communications service assignment and reassignment processes discussed herein may be individually or collaboratively determined by one or more network controller devices, also referred to herein as radio communications controllers, common to modern Global Systems for Mobile (GSM), Universal Mobile Telecommunications System (UMTS), and Long Term Evolution (LTE) network infrastructure. In accordance with a standard GSM network, any of the service provider controller devices 110, 112, and 114 may be associated with a base station controller (BSC), a mobile switching center (MSC), or any other common service provider control device known in the art, such as a radio resource manager (RRM). In accordance with a standard UMTS network, any of the service provider controller devices 110, 112, and 114 may be associated with a radio network controller (RNC), a serving GPRS support node (SGSN), or any other common service provider controller device known in the art, such as a radio resource manager (RRM). In accordance with a standard LTE network, any of the service provider controller devices 110, 112, and 114 may be associated with an eNodeB base station, a mobility management entity (MME), or any other common service provider controller device known in the art, such as a radio resource manager (RRM).

In an embodiment, any of the service provider controller devices 110, 112, and 114, the remote base stations 106*a-b*, the transceiver devices 118, 120, and 122, or any of the user equipment (108*a-c*, 124, 126*a-c*, 128, 130, and 132), may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, any of the remote base stations 106*a-b* may employ any number of common server, desktop, laptop, and personal computing devices.

In an embodiment, the user equipment (108*a-c*, 124, 126*a-c*, 128, 130, and 132) may include any combination of common mobile computing devices (e.g., laptop computers, net book computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions (e.g., the backhaul or local portions) of the data communications network 102 of FIG. 1 may employ, but are not limited to, any of the following common communications technologies: optical fiber, coaxial cable, twisted pair cable, Ethernet cable, and powerline cable, along with any wireless communication technology known in the art. In an embodiment, any of the service provider controller devices 110, 112, and 114, the remote base stations 106*a-b*, the transceiver devices 118, 120, and 122, or any of the user equipment (108*a-c*, 124, 126*a-c*, 128, 130, and 132), may include any standard computing software and hardware necessary for processing, storing, and communicating data amongst each other within the networked computing system 100. The computing hardware realized by any of the network computing system 100 devices (106*a-b*, 108*a-c*, 110, 112, 114, 116, 118, 120, 122, 124, 126*a-c*, 128, 130, or 132) may include, but is not limited to: one or more processors, volatile and non-volatile memories, user interfaces, transcoders, modems, and wireline and/or wireless communications transceivers, etc.

Further, any of the networked computing system 100 devices (106*a-b*, 108*a-c*, 110, 112, 114, 116, 118, 120, 122, 124, 126*a-c*, 128, 130, or 132) may be configured to include one or more computer-readable media (e.g., any common volatile or non-volatile memory type) encoded with a set of computer readable instructions, which when executed, performs a portion of any the ancillary communications detection, measurement, and assignment processes associated with various embodiments of the present invention.

In context with various embodiments of the present invention, it should be understood that wireless communications coverage associated with various data communication technologies and cell types typically vary amongst different service provider networks based on the type of network and the system infrastructure deployed within a particular region of a network (e.g., differences amongst GSM, UMTS, and LTE networks and the resources deployed in each network). As would be understood by those skilled in the Art, within all wireless networks, macrocells typically provide the largest wireless coverage area for licensed frequency spectra, followed by microcells, then picocells, and lastly femtocells. Determining whether a cell is considered a larger cell or a smaller cell is primarily based on a reference cell to which the cell in question in being compared. For example, a microcell may be considered to be a smaller cell compared to a macrocell and a larger cell compared to both a picocell and a femtocell. Likewise, a picocell may be considered to be a smaller cell compared to both a macrocell or a microcell and a larger cell compared to a femtocell. Further, one picocell may be considered to be a larger cell than another picocell, based on coverage area comparison between the two picocells and the technologies employed at the cells. In general, when comparing dissimilar cell types, a macrocell is always considered to be a larger cell, and a femtocell is always considered to be a smaller cell.

Figure 2:
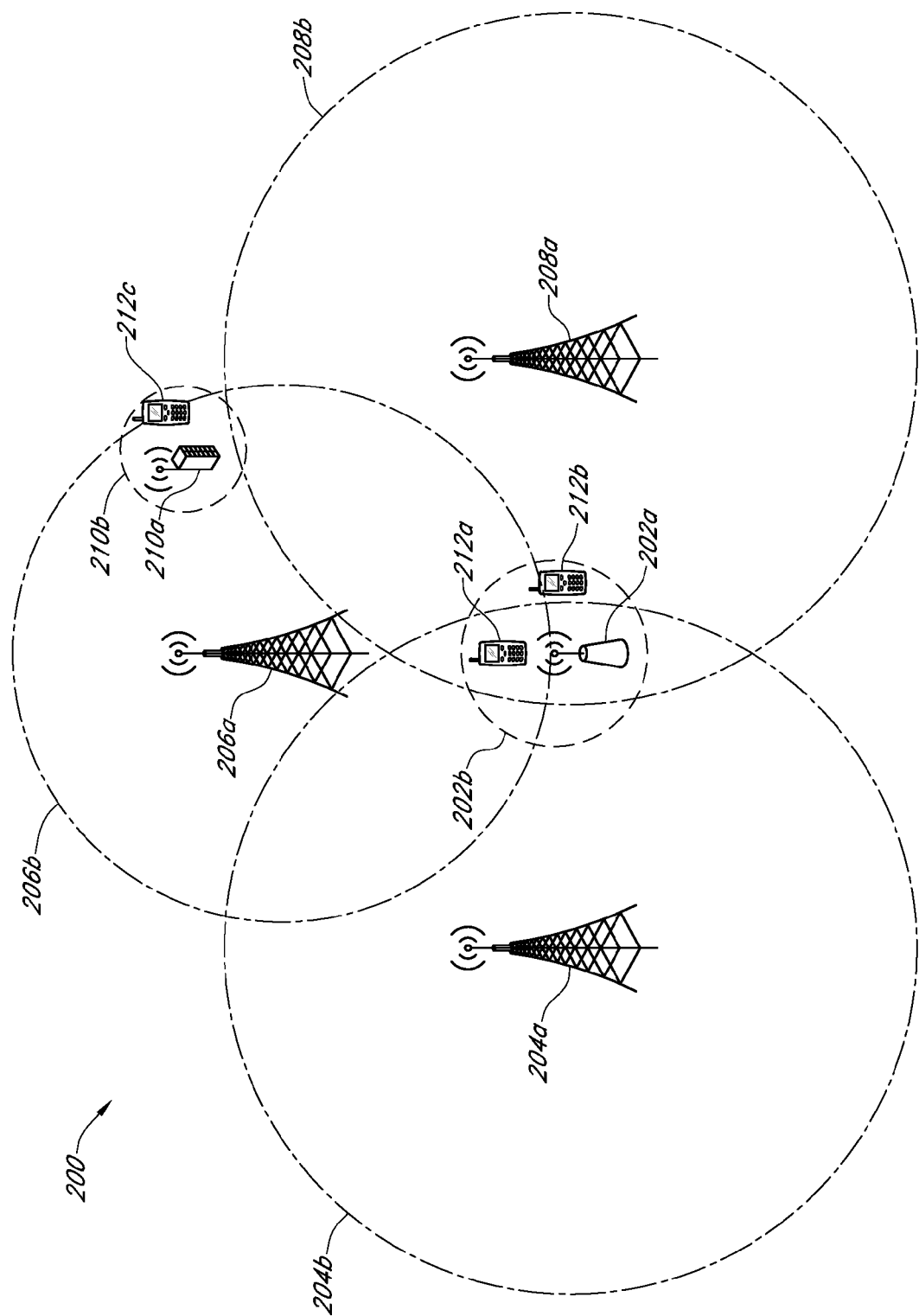
FIG. 2 illustrates a network topology comprising various network base stations and transceiver devices as part of larger distributed data communications network in accordance with an embodiment of the present invention.

FIG. 2 illustrates a network topology 200 comprising various network base stations (204*a*, 206*a*, and 208*a*) and transceiver devices (202*a* and 210*a*) that may be part of a larger distributed data communications network. The network cells and user equipment depicted in FIG. 2 may be representative of any of the cells (106*a-b*, 118, 120, and 122) or user equipment (108*a-c*, 124, 126*a-c*, 128, 130, and 132) depicted in FIG. 1. In an embodiment, the network topology 200 may be consistent with any of a common GSM, UMTS, or LTE network topology. In particular, the network topology 200 depicts overlaying cell coverage areas amongst various network cell types (e.g., macrocells, microcells, picocells, and femtocells) and various user equipment 212*a-c* that are independently distributed within the coverage areas of multiple network cells 202*a*, 204*a*, 206*a*, and 208*a*. In an embodiment, user equipment 212*a*, which may be representative of any of the user equipment (108*a-c*, 124, 126*a-c*, 128, 130, and 132) of FIG. 1, is geographically positioned within the cell coverage areas (202*b*, 204*b*, 206*b* and 208*b*) of four different network cells (202*b*, 204*b*, 206*b* and 208*b*). User equipment 212*b*, which may be representative of any of the user equipment (108*a-c*, 124, 126*a-c*, 128, 130, and 132) of FIG. 1, is geographically positioned within the cell coverage areas (202*b*, 206*b* and 208*b*) of three different network cells (202*b*, 206*b* and 208*b*). User equipment 212*c*, which may be representative of any of the user equipment (108*a-c*, 124, 126*a-c*, 128, 130, and 132) of FIG. 1, is geographically positioned within the cell coverage areas (206*b* and 210*b*) of two different network cells (206*b* and 210*b*).

In this scenario, network cells, 204*a* and 208*a*, may be associated with a macrocells providing wireless coverage areas, 204*b* and 208*b*, having a radial coverages ranging between one to five kilometers; network cell 206*a* may be associated with a microcell providing a wireless coverage area 206b, having a radial coverage ranging between one-half to one kilometer; network cell 202a may be associated with a picocell providing a wireless coverage area 202b, having a radial coverage ranging between 100 to 500 meters; and network cell 210a may be associated with a femtocell providing a wireless coverage area 210b having a radial coverage ranging less than 100 meters.

As will be further described herein, when a user equipment 212a-c receiving wireless communications service from a larger cell (e.g., a macrocell or a microcell), moves into the coverage area(s) of one or more smaller cell(s) (e.g., microcells, picocells, and/or femtocells), a network controller device (e.g., 110, 112, and 114) or a larger cell base station (e.g., 106a-b), acting as a controller, may want to make network service handover decisions relating to which regional cell should provide services to the roaming user equipment 212a-c. For example, when user equipment 212c is communicating with microcell 206a and then relocates into the coverage area 210b of femtocell 210a, a network controller device may wish to handover service from the microcell 206a to the femtocell 210a, such that the femtocell 210a provided wireless communications service to the user equipment 212c, while the user equipment remained within the coverage area 210b of the femtocell 210a. This reassignment or handover may be desired because of a present or a predicted state of heavy traffic for the microcell 206a, or because femtocell 210a can simply provide user equipment 212c better quality of service (QOS) than the microcell 206a at the user equipment's 212c present geographic location.

It should be understood that the frame structure allocation diagram 300 associated with 3GPP LTE downlink communications as well as the frequency allocation diagram 400 associated with 3GPP LTE uplink communications (discussed below) are solely intended to provide background information for describing how communications resources may be represented within a downlink communications time domain (frame) structure and an uplink communications frequency domain (channel) structure. As discussed herein, other common communications technologies associated with GSM and UMTS networks are also contemplated as vehicles for carrying out any of the ancillary communications detection, measurement, and assignment processes associated with various embodiments of the present invention.

As such, any LTE based embodiments disclosed herein should not be interpreted to limit the scope of the invention to LTE technology. Instead, these embodiments should be viewed as optional network technology embodiments for carrying out the ancillary communications detection, measurement, and assignment processes associated with the present invention. Similarly there may be GSM based and UMTS based technology embodiments where the same inventive processes may be achieved utilizing the inherent technologies associated with these different communications types.

Figure 3:
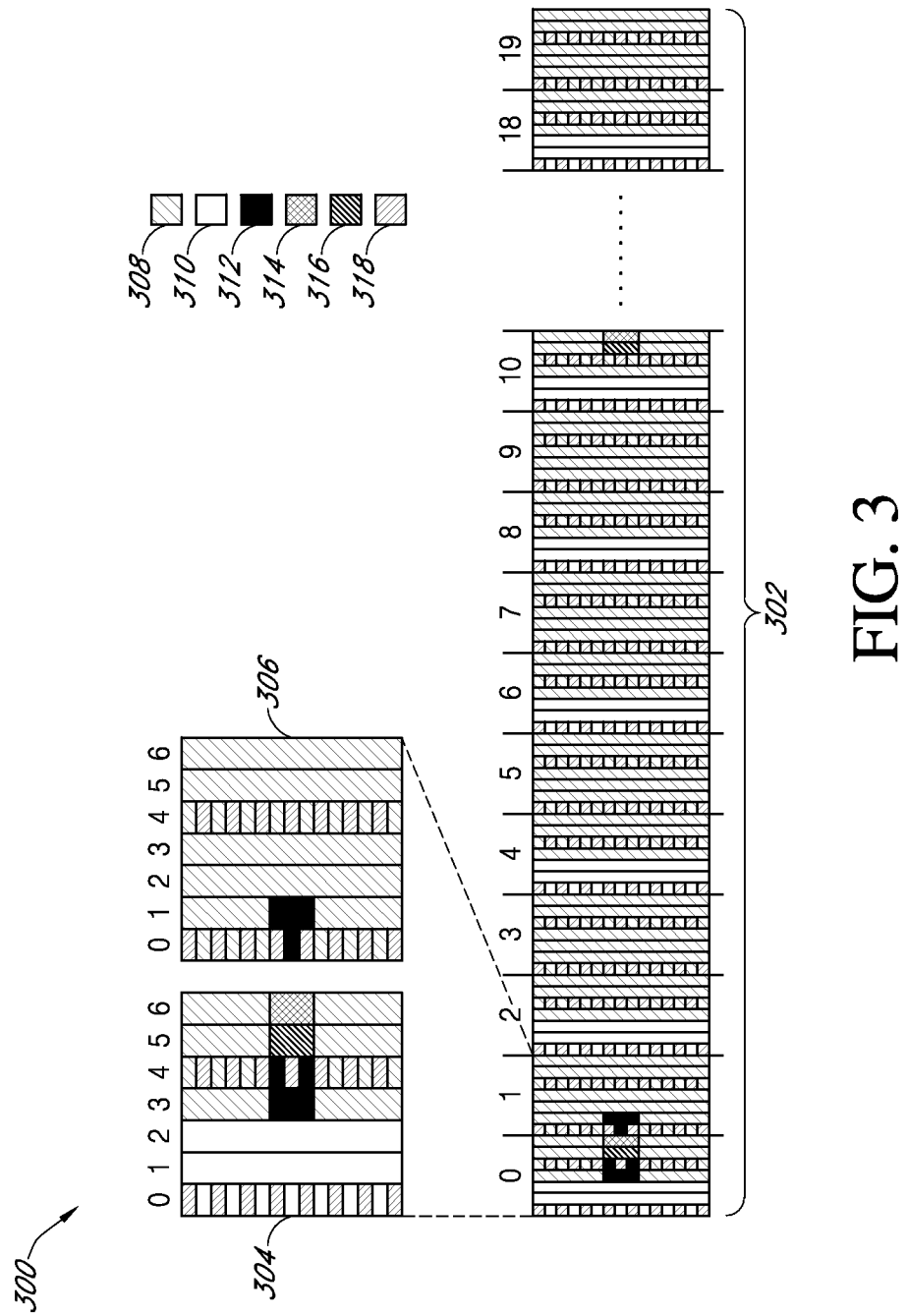
FIG. 3 illustrates a diagram of timing resources and frame structure allocation associated with 3GPP Long Term Evolution (LTE) communications in accordance with the Prior Art.

FIG. 3 illustrates a timing resources and frame structure allocation diagram 300 associated with 3GPP Long Term Evolution (LTE) downlink communications. The downlink communications diagram includes one frame 302 consisting of 20 10 mSec slots (labeled 0-19). Every pair of slots 304 and 306 (starting with slots 0 and 1) is equivalent to one 1 mSec sub-frame. Accordingly, each frame 302 has 10 sub-frames. Further, each slot 304 and 306 has 7 symbols (labeled 0-6) which are serial in time domain. As would be understood by those skilled in the art, the vertical dimension of a symbol represents a frequency spectrum.

The downlink frame 302 utilizes six different channels to transfer data during downlink communications. The first channel is the physical downlink shared channel (PDSCH) 308 that may be used to send common user data and control information to user equipment (e.g., UEs 212a or 212b), and optionally smaller cell transceiver devices (e.g., picocell 202a) operating within the coverage area of an overarching base station (e.g., macrocell 208a or a microcell 206a). The next channel is the physical downlink control channel (PDCCH) 310 which is transmission channel that may be used to transfer control information to user equipment. The PDCCH 310 defines how the PDSCH 308 is configured and defines uplink transmission scheduling information to help coordinate access control to a sending base station. The PDCCH 310 may be transmitted as the first symbol of a slot. Next, the physical broadcast channel (PBCH) 312 is a transmission channel that may be used to transfer information to user equipment. The PBCH 312 may periodically send system identification and access control parameters. The primary synchronization channel (P-SCH) 314 and the secondary synchronization channel (S-SCH) 316 may be used to inform subscriber devices of the current cell timing and scrambling code. The reference signal (Pilot) 318 may carry a cell identity.

Figure 4:
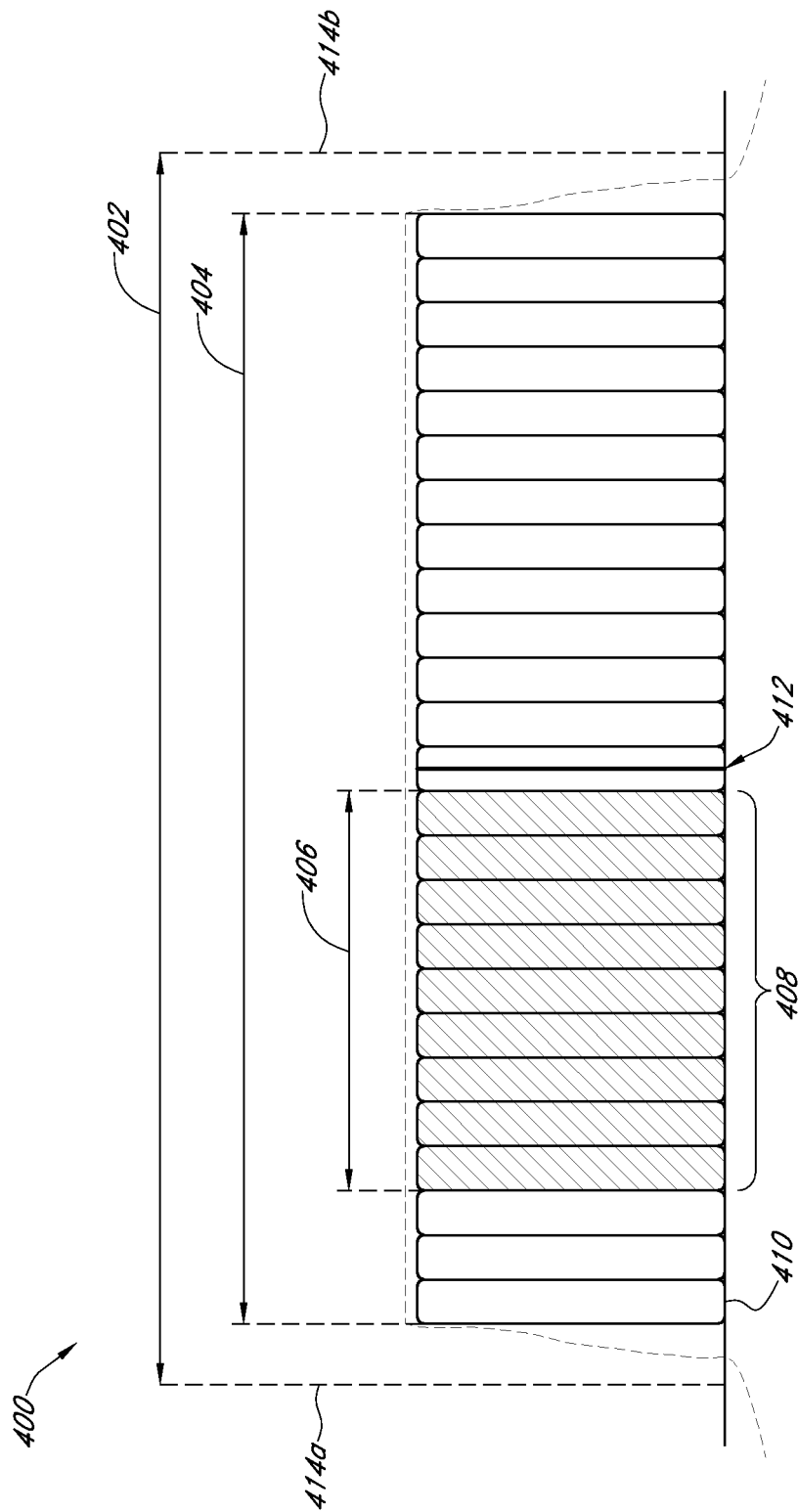
FIG. 4 illustrates a diagram depicting how frequency resources over a 3GPP LTE communications channel may be utilized for detecting ancillary device communications in accordance with an embodiment of the present invention.

FIG. 4 illustrates an embodiment of the invention that depicts how frequency resources over a 3GPP LTE communications channel may be utilized for detecting ancillary device communications. More specifically, FIG. 4 illustrates a frequency resources diagram 400 associated with an uplink or downlink communications channel that may be affiliated with various embodiments of the present invention. The frequency resources diagram 400 represents a single radio channel, having a set channel bandwidth 402 (e.g., measured in MHz). The channel bandwidth 402 is bordered on both sides by channel edges 414a and 414b. To keep from losing channel edge data communications in the frequency domain (resource blocks 410 located to close to the channel edges 414a and 414b), data communications in the frequency domain are typically restricted to a reliable transmission bandwidth configuration 404 that is smaller than the channel bandwidth 402. This is intended to prevent lossy or degraded data communications. Within the segmented resource blocks 410 of the transmission bandwidth configuration 404, only a portion of the available resource blocks may be actively being used during uplink communications (e.g., communications from a UE to a base station). These resource blocks are known as active resource blocks 408 and they are part of an actual transmission bandwidth 406. The remaining resource blocks that are not used in a data communication are considered inactive resource blocks (e.g., all resource blocks falling within the transmission bandwidth configuration 404 that are not active resource blocks 408). In the downlink, there is a DC carrier component 412 of a downlink waveform (e.g., an LTE downlink waveform) that is an artifact resulting from the real-world implementation of an orthogonal frequency division multiplexing (OFDM) transmitter. As would be understood by those skilled in the art, in some transmitter implementations the output of the IFFT is imposed on a DC level in order to feed the resulting signal into a frequency converter which results in a DC component being added to a transmitted OFDM signal. Generally this may not be a problem as long as the intended receiver ignores this component of a transmission.

In accordance with an embodiment of the present invention, the following example illustrates the capability of a smaller cell transceiver device (e.g., any of a microcell 206a, picocell 202a, or femtocell 210a) to receive more airlink resources than it practically uses for providing service to various user equipment (e.g., any of user equipment 212a-c). As shown in FIG. 4, the frequency band of operation 404 is parceled into smaller chunks called resource blocks 410. In this example the resource blocks utilized by the transceiver device of interest 210a are shaded active resource blocks 408. However, this same transceiver device 210a may receive all of the resource blocks within the transmission bandwidth 404, which includes inactive resource blocks (all non-shaded resource blocks). These inactive resource blocks are not idle, but may be in use by surrounding base stations and transceiver devices (e.g., by base stations 206a or 208a), as the same frequency spectrum is often shared amongst many transceiver devices.

Essentially, the transceiver device of interest 210a may be configured to receive all the resource blocks of the transmission bandwidth 404, but it only actually uses the shaded subset of active resource blocks 408. There may be several reasons for this restricted use, including excess local interference or simply a lack of need to serve a local traffic load. As will be further described herein, since the transceiver device, receives 210a these additional unused or inactive resource blocks, it is fully capable of recognizing (detecting them) and making measurements on them.

In most cellular networks, connections are originally established by a user equipment (e.g., any of 108a-c, 124, 126a-c, 128, 130, and 132 of FIG. 1) transmitting an uplink session initiation signal, such as Random Access Channel (RACH) signal. In this scenario, the initial request is sent by the user equipment to the a primary serving base station (e.g., a macrocell 208a) radio access node to establish a signaling connection which the two devices will further establish as a service connection in response to a subscriber's intended communications usage. As will be further described herein these RACH transmissions are generally detectable by all local serving base stations or transceiver devices in the regional area of the user equipment (e.g., on the inactive resource blocks of their respective transmission bandwidth 404).

As would be understood by those skilled in the Art, radio access nodes (also referred to herein as transceiver devices and base stations) in a 3GPP LTE access network may be interconnected via a technology specific interface called X2 interface. The radio access nodes may share information regarding their radio resource usage using the X2 interface. Other communications between radio access nodes may also take place over the X2 interface as defined in the 3GPP LTE series of standards. 3GPP LTE radio access nodes are generally able to receive and process more airlink resources (channel resource blocks) than are used by their cell. These other excess channel resources will be in use by surrounding cells, so a given radio access node may be capable of making measurements of its neighbor cell's channel resources by having knowledge of which channel resources its neighbor cell's are using.

In networks with self-optimizing capabilities, such as 3GPP LTE, radio access nodes may direct user equipment to make measurements of surrounding cells and report the measurements back to the local network service provider. The surrounding cells could be 3GPP LTE cells or radio access nodes of different networks and access technologies, such as GSM and UMTS. In this example, groups of cells within a network can include a truly heterogeneous mixture of cell types (e.g., macrocells, microcells, picocells, and femtocells) and network technologies.

As would be understood by those skilled in the Art, a cellular "handover" may generally be defined as the changing of the subscriber device's (user equipment) access connection from one radio access node (e.g., from a macrocell) to another (e.g., to a femtocell), generally under the direction of a service provider controller device (e.g., a radio communications controller). Network handovers may occur as the result of moving user equipment, which leaves the coverage area of one cell and enters the coverage area of another cell. Other times, network handovers may occur as the result of network traffic loading. For example, when a serving macrocell is experiencing an unusually heavy traffic load, a network controller device may direct user equipment being served by the macrocell to switch to a smaller network cell within the user's local region, which has more capacity than the macrocell. These handovers may be made so that network subscribers experience a stable QOS from their network service provider.

Figure 5:
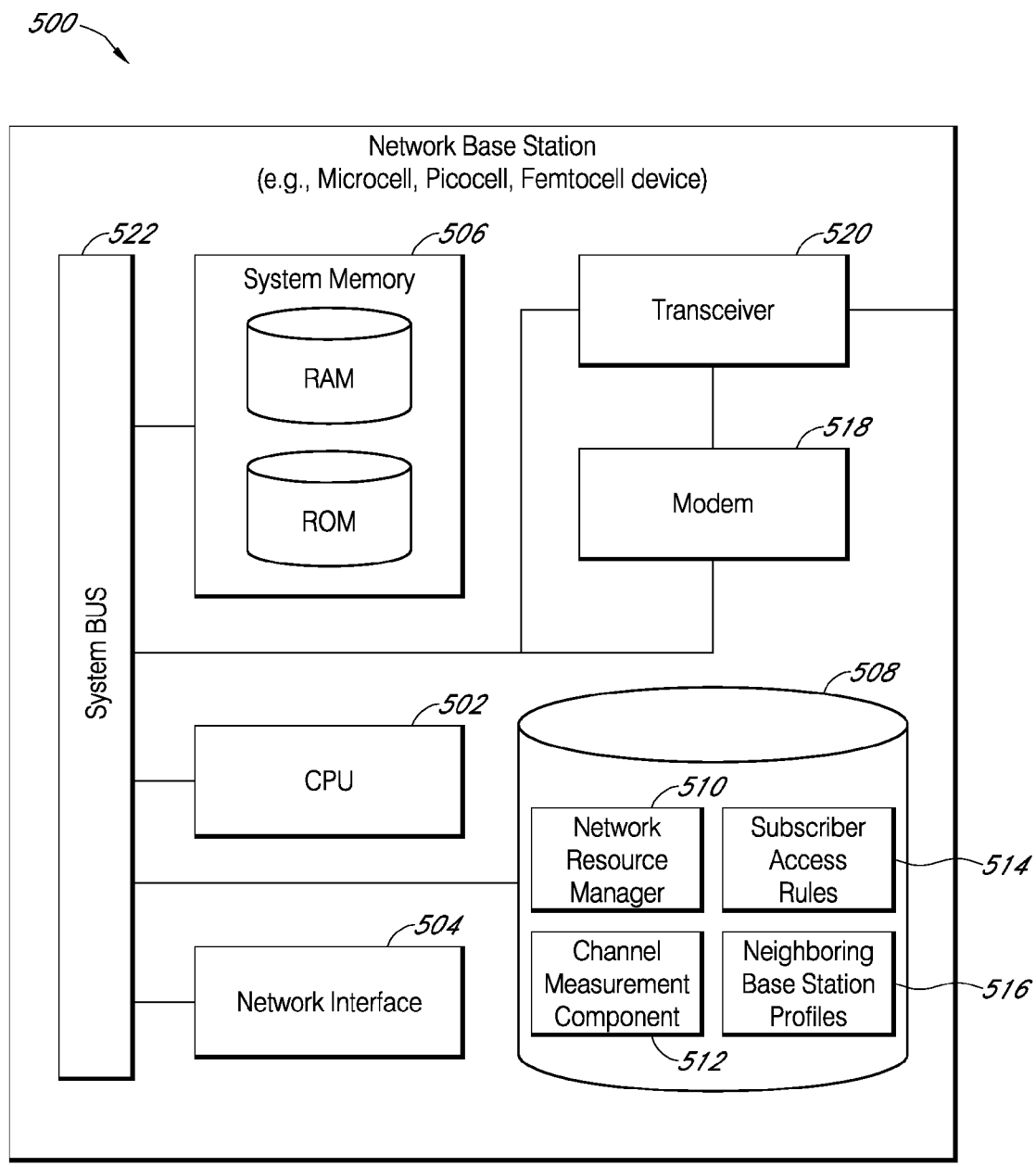
FIG. 5 illustrates a block diagram of a network base station in accordance with an embodiment of the present invention.

FIG. 5 illustrates a block diagram view of a network transceiver device/base station 500 (e.g., a microcell, a femtocell, or a picocell base station) that may be a smaller cell compared to a macrocell base station. The transceiver device may be representative of any of the remote base stations 106a-b, or the transceiver devices 118, 120, and 122 in FIG. 1. In accordance with an embodiment of the present invention, the network transceiver device 500 may include, but is not limited to, one or more data processing devices including a central processing unit (CPU) 502. In an embodiment, the CPU 502 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 502 is responsible for executing all computer programs stored on the network transceiver device's 500 volatile (RAM) and nonvolatile (ROM) system memories, 506 and 508.

The network transceiver device 500 may also include, but is not limited to a network interface component 504 that can facilitate the network transceiver device 500 communicating across either the LAN and/or WAN portions the data communications network 102; a modem 518 for modulating an analog carrier signal to encode digital information and for demodulating a carrier signal to decode digital information; a wireless transceiver component 520 for transmitting and receiving wireless communications from any of the networked computing system 100 devices (106a-b, 108a-c, 118, 120, 122, 124, 126a-c, 128, 130, or 132) utilizing the data communication network 102 of the networked computing system 100; a system bus 522 that facilitates data communications amongst all the hardware resources of the network transceiver device 500; a software/database repository 508 including: a network resource manager component 510, a channel measurement component 512, a repository of subscriber access rules 514, and a repository of neighboring base station profiles 516.

In accordance with an embodiment of the present invention, the network resource manager component 510 may be configured to communicate with, and collaborate with, one or more service provider controller devices 110, 112, and 114, and remote base stations 106a-b that function, independently or collectively, as radio communications controllers. In response to instructions from a radio communications controller 600 or from autonomous internal directives the resource management component 510 of the network transceiver device 500 may be responsible for communicating with neighboring base stations to determine their available resources or to direct the channel measurement component 512 to detect and measure ancillary communications between a user equipment and a network base station. The resource management component 510 may further be configured to independently direct the channel measurement component 512 to detect and measure communications session initiation signals transmitted from regional user equipment attempting to connect to a neighboring network base station.

The repository of subscriber access rules 514 may include service provider or local subscriber access instructions that designate what specific registered users can roam onto the network transceiver device 500 and what usage rules those registered users must conform to. The network transceiver device 500 may also store listings of neighboring base stations, as well as their communications and access characteristics, in the repository of neighboring base station profiles 516. At any time, the radio communications controller 600 may require the network transceiver device 500 to provide it with information from ancillary communications measurements and/or from its neighboring base station profiles repository 516. Alternatively, the network transceiver device 500 may automatically provide the radio communications controller 600 with any new or updated information acquired from ancillary communications or neighboring base stations.

Figure 6:
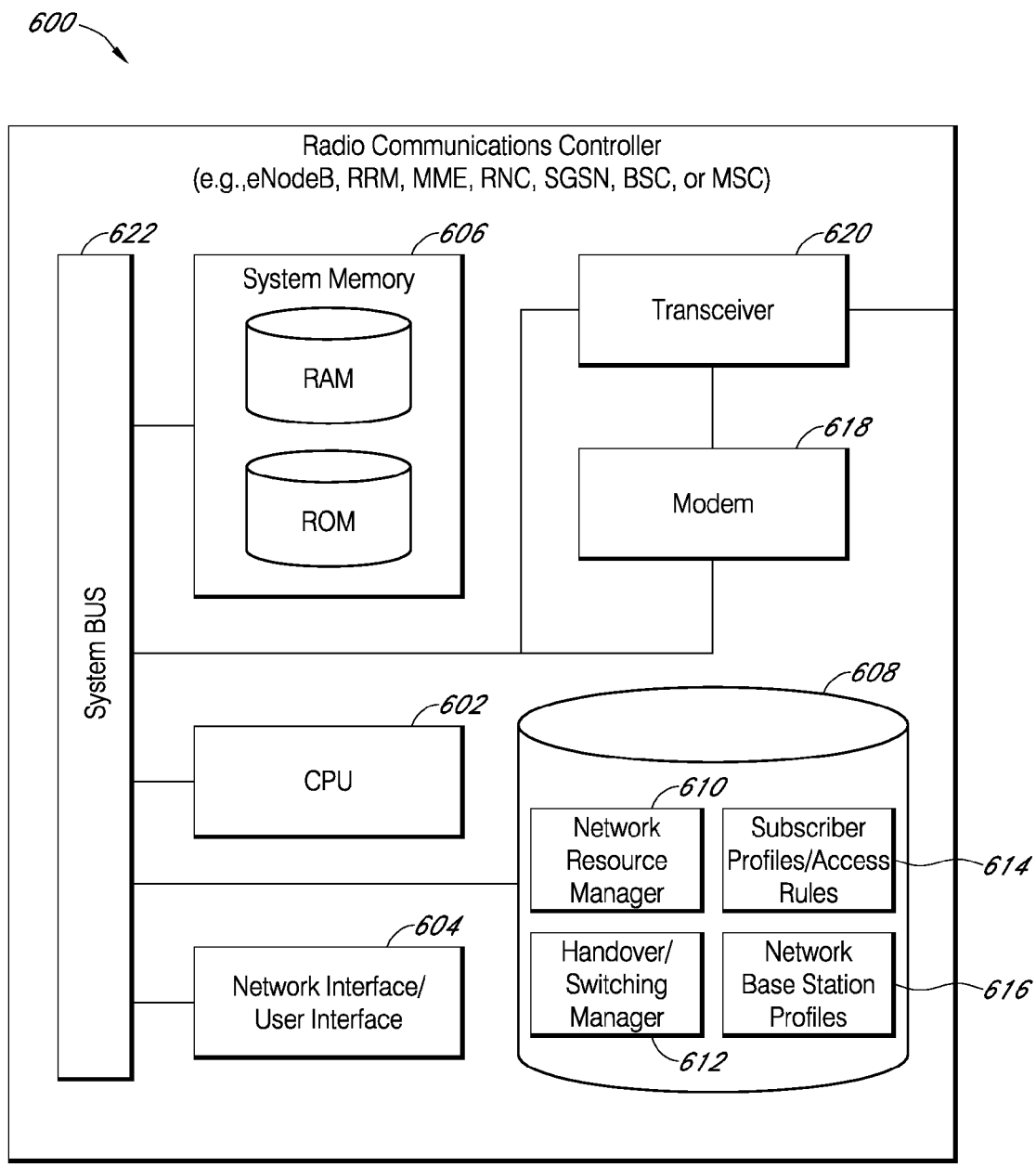
FIG. 6 illustrates a block diagram of a radio communications controller in accordance with an embodiment of the present invention.

FIG. 6 illustrates a block diagram view of a radio communications controller 600 (e.g., an eNodeB, RRM, MME, RNC, SGSN, BSC, or MSC) that may be configured to operate in accordance with GSM, UMTS, or LTE communications technology. The radio communications controller may be representative of any of the service provider controller devices 110, 112, and 114, remote base stations 106a-c in FIG. 1. In accordance with an embodiment of the present invention, the radio communications controller 600 may include, but is not limited to, one or more data processing devices including a central processing unit (CPU) 602. In an embodiment, the CPU 602 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 602 is responsible for executing all computer programs stored on the radio communications controller's 600 volatile (RAM) and nonvolatile (ROM) system memories, 606 and 608.

The radio communications controller 600 may also include, but is not limited to a network interface/user interface component 604 that can facilitate the radio communications controller 600 communicating across either the LAN and/or WAN portions the data communications network 102 and it may allow a network administrator to access its local software and hardware resources; a modem 618 for modulating an analog carrier signal to encode digital information and for demodulating a carrier signal to decode digital information; a wireless transceiver component 620 for transmitting and receiving wireless communications from any of the networked computing system 100 devices (106a-b, 108a-c, 110, 112, 114, 116 118, 120, 122, 124, 126a-c, 128, 130, or 132) utilizing the data communication network 102 of the networked computing system 100; a system bus 622 that facilitates data communications amongst all the hardware resources of the radio communications controller 600; a software/database repository 608 including: a network resource manager component 610, handover/switching manager component 612, a repository of subscriber profiles and access rules 614, and a repository of network base station profiles 616.

In accordance with an embodiment of the present invention, the network resource manager component 610 may be configured to communicate with and collaborate with various distributed network controller devices (e.g., 110, 112, and 114), base stations (e.g., 106a-b), transceiver devices (e.g., 118, 120, and 122), and user equipment (e.g., 108a-c, 124, 126a-c, 128, 130, and 132), in order to effectively assign and distribute network resources amongst service provider equipment and amongst user equipment residing in various network sectors optionally having multiple service options. The handover/switching manager component 612 may be configured to keep track of all active communications sessions between network subscribers' user equipment and various network base stations, such that it can collaborate with the network resource manager 610 to determine whether one or more handovers should take place within the service provider network to maximize available network resources.

The repository of subscriber profiles and access rules 614 repository may include a listing of registered subscriber profiles as well as a listing of subscriber access instructions that designate what specific registered users can access specific network resources (e.g., information related to which subscribers can roam on to what network cells and what communications those subscriber's data rate plans allow). The repository of network base station profiles 616 may also store listings of network base station profiles, along with their respective communications and access characteristics.

Figure 7:
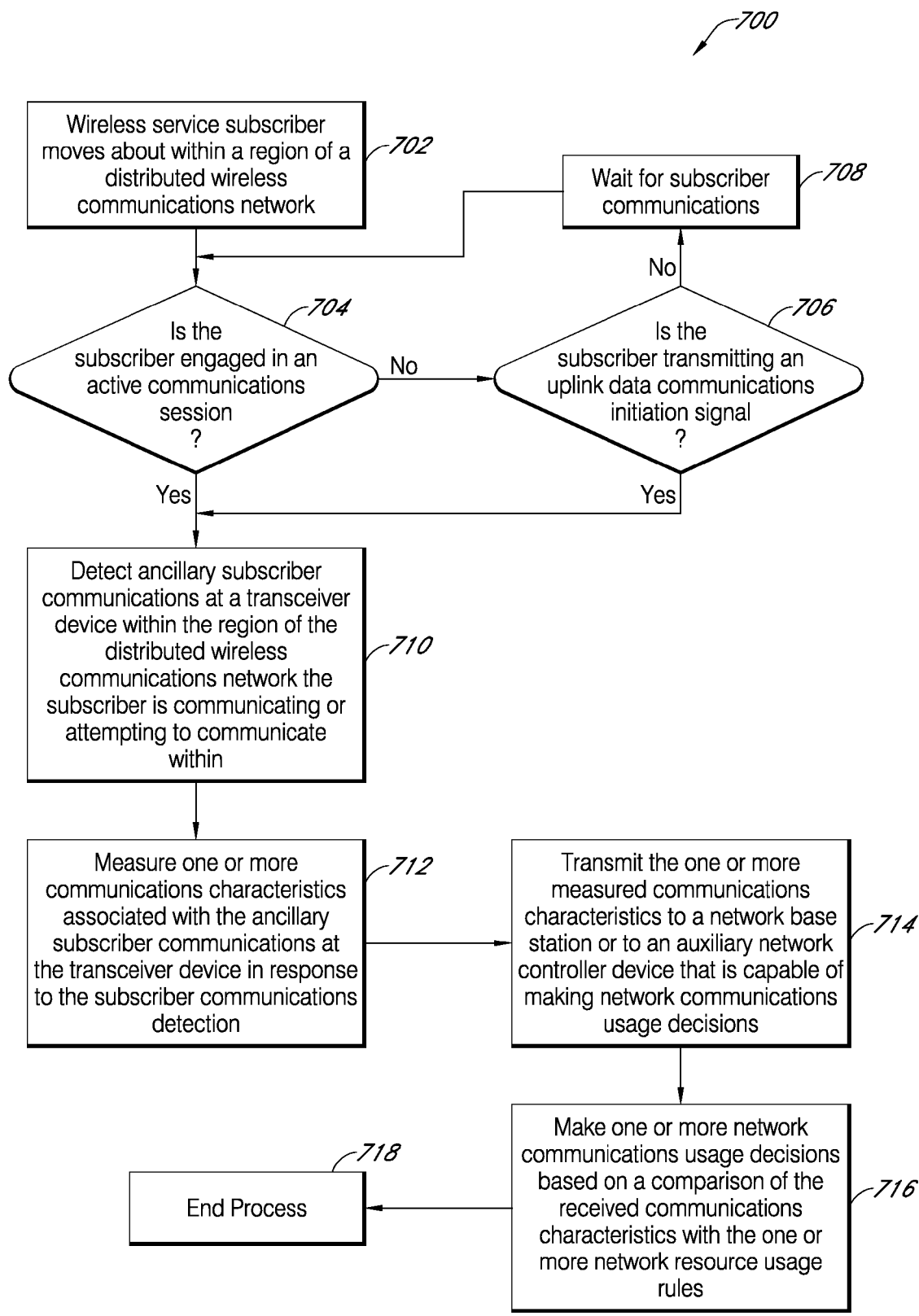
FIG. 7 illustrates a flow diagram depicting ancillary communications detection and measurement processes associated with an embodiment of the present invention.

FIG. 7 illustrates a flow diagram 700 depicting ancillary communications detection, measurement, and evaluation processes associated with an embodiment of the present invention. It should be understood that this process 700 could be executed using one or more computer-executable programs stored on one or more computer-readable media located on any of the network computing system's 100 transceiver devices 118, 120, and 122 or collaboratively on any of the network's base station 106a-c or controller devices 110, 112 and 114 of FIG. 1 (or on any other common service provider device known the Art, such as those common to GSM, UMTS, and LTE networks). At block 702, a wireless service subscriber (e.g., a subscriber operating any of user equipment 108a-c, 124, 126a-c, 128, 130, and 132 of FIG. 1) moves about within a region of a distributed wireless communications network. Next, at decision block 704, it is determined of the subscriber is engaged in an active communications session (e.g., with any of base stations 106a-b or transceiver devices 118, 120, or 122). If it is determined that the subscriber is engaged in an active communications session, then the process proceeds to block 710. However, if it is determined that the subscriber is not engaged in an active communications session, then the process proceeds to decision block 706, where it is determined if the subscriber is transmitting an uplink data communications initiation signal (e.g., a RACH signal). If the subscriber is also not yet transmitting an uplink data communications initiation signal, then the process proceeds to block 708 where the process waits for any subscriber communications event before proceeding back to decision block 704, where the process repeats. However, if the subscriber is transmitting an uplink data communications initiation signal, then the process proceeds to block 710, where a transceiver device, within the same region of the distributed wireless communications network where the subscriber is communicating or attempting to communicate, detects the ancillary subscriber communications.

Next, the process proceeds to block 712, where the transceiver device measures one or more characteristics (e.g., a radio power level and/or transmission quality metrics) associated with the ancillary subscriber communications at the transceiver device, in response to the subscriber communications detection at block 710. Subsequently, the process proceeds to block 714, where the transceiver device transmits (e.g., a process initiated either autonomously or by network controller device instruction) the one or more measured characteristics to a network base station or to an auxiliary network controller device (e.g., radio communications controller 600) that is capable of making network communications usage decisions. Then the process proceeds to block 716, where a network communications controller makes one or more network communications usage decisions (e.g., whether to handover the subscriber communications to a new service provider device within their local network), based on a comparison of the received communications characteristics (a radio power level and/or transmission quality metrics) with one or more network resource usage rules. A couple examples of common network resource usage rules that may be evaluated during a received measurement/characteristics comparison, may include: determining if an SINR of a received signal is above a minimum threshold for desired service quality or determining if a subscriber profile indicates that the user's tariffing rate would be lower on the smaller cell (e.g., a picocell or a femtocell) than the current servicing cell (e.g., a macrocell). Subsequently, the process ends at block 718.

Figure 8:
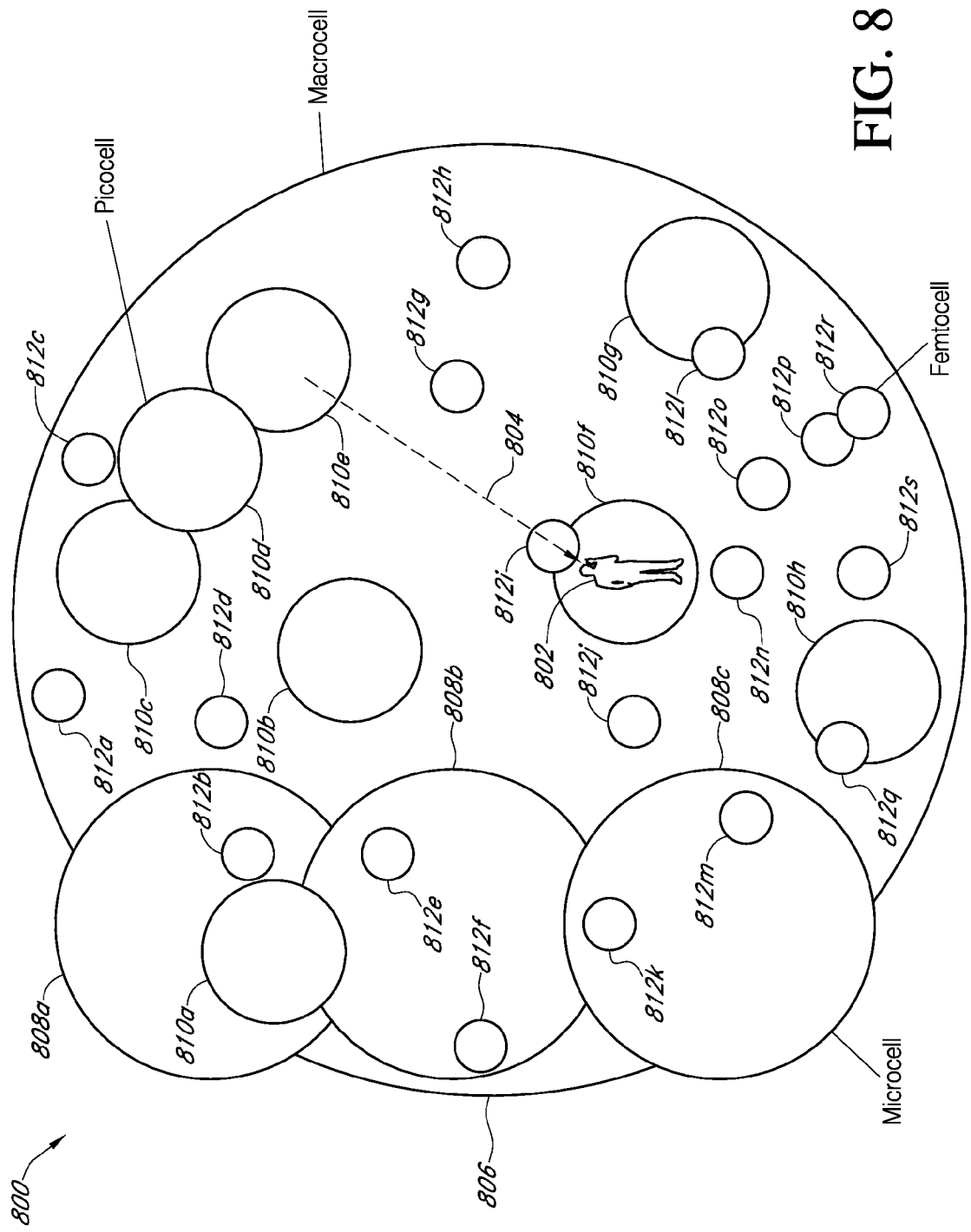
FIG. 8 illustrates a subscriber path across various cell coverage regions in accordance with an embodiment of the present invention.

FIG. 8 illustrates generic cell coverage topology 800 depicting a subscriber path 804 across various cell coverage regions within a region of a cell coverage topology in accordance with an embodiment of the present invention. The cell coverage topology 800 may include, but is not limited to, a single macrocell 806 as the largest cell region covered by a base station 106a, a few microcells 808a-c as the next largest cell regions, several picocells 810a-h that have the next largest cell regions, and many femtocells 812a-s than have the smallest cell regions of the cell types. In accordance with an embodiment of the present invention a network subscriber 802 may move from along path 804, entering the cell coverage areas of several different network cells along the way.

Along path 804, the subscriber 802 may start off in picocell 810e, receiving wireless service from a picocell transceiver device 118 within that cell. After leaving the picocell 810e, the overarching macrocell 806 may take over communications for the network subscriber 802, until a radio communications controller 600 receives feedback from femtocell 812i (e.g., measurements made by the femtocell transceiver device 122 of the subscribers ancillary communications with the macrocell base station 106a) that the subscriber 802 has entered its coverage area, at which time the radio communications controller 600 compares the received measurements to a set of usage rules. After making a resource comparison, the radio communications controller 600 may elect to handover the subscriber 802 communications task to the femtocell transceiver device 122. Alternately, the radio communications controller 600 may elect to allow the subscriber 802 to continue communicating with the macrocell 806.

Next, the subscriber 802 moves into picocell 810f, where the picocell transceiver device 120 measures communications between the subscriber and either the macrocell 806 base station 106a or the femtocell 812i base station 122. Then the picocell transceiver device 120 transmits the measurements to the radio communications controller 600. The radio communications controller 600 receives the feedback (e.g., the measurements made by the picocell transceiver device 120) from the picocell 810f that the subscriber 802 has entered its coverage area, at which time the radio communications controller 600 compares the received measurements its usage rules. After making the comparison, the radio communications controller 600 may elect to handover the subscriber 802 communications task to the picocell transceiver device 120. Alternately, the radio communications controller 600 may elect to allow the subscriber to continue communicating with the macrocell 806 or the femtocell 812i (based on the prior handover decision). In this scenario, the radio communications controller 600 may make numerous handover decisions for the same subscriber 802 based on autonomous, smaller cell feedback about ancillary device communications, such that the subscriber's 802 user equipment remains unburdened by the handover processes (e.g., by not needing to perform continual scans of available regional base stations and transceiver devices).

In an embodiment, in 3GPP LTE networks may consist of cells which are not deployed in traditional manners. In dense urban areas, there may be mixtures of cells of various sizes that will be deployed without regard for traditional RF concerns such as planned RF channels and power levels. Also capacity needs may target hotspots such as train stations and enterprises so coverage areas may be irregular with a high degree of overlap in some areas.

FIG. 8 may further show an example of coverage areas resulting from such a deployment methodology. In this embodiment the path of the subscriber 804 represents the movement of a user whose device registers with the macrocell 806 and then moves into the coverage area of a picocell 810f while in idle mode. The subscriber 802 may turn on their device while on the street and then walk into a shop with a picocell 810f providing coverage for the premises. When the subscriber 802 enters the coverage area of the picocell 810f it may not detect the presence of the picocell 810f if the signal from the macrocell 806 remains strong, and so the user device will remain camped on the macrocell 806. If the subscriber 802 initiates a call, the initial service request will be sent to the macrocell 806 since that is where the device is camped.

Generally a picocell 810a-h receives more resources than it uses, and it is aware of which resources are being used by the macrocell 806. So as the service request is sent to the macrocell 806, the picocell 810f receives energy from the subscriber's 802 transmission, and the picocell 810f can therefore make measurements of the signal strength and quality of the user's transmission with the knowledge that it was sent to the macrocell 806. The picocell 810f may then contact the macrocell 806 with the information that it received the service request at a level such that the picocell 810f could provide service to the subscriber 802. The macrocell 806 may request the subscriber's 802 device to make a measurement of the picocell's broadcast channel to ensure that a good connection will be made. If more than one transceiver device (e.g., picocell 810f and femtocell 812i) contacts the macrocell 806 regarding the receipt of the service request, then the macrocell 806 may make a determination of the most suitable alternative based on factors such as signal strength or quality metrics. If all looks good, then the macrocell 806 may redirect the subscriber 802 device over to the picocell 810f for service until such time that the subscriber 802 terminates the connection or moves out of the coverage area of the picocell 810f and hands over to the macrocell 806.

Figure 9:
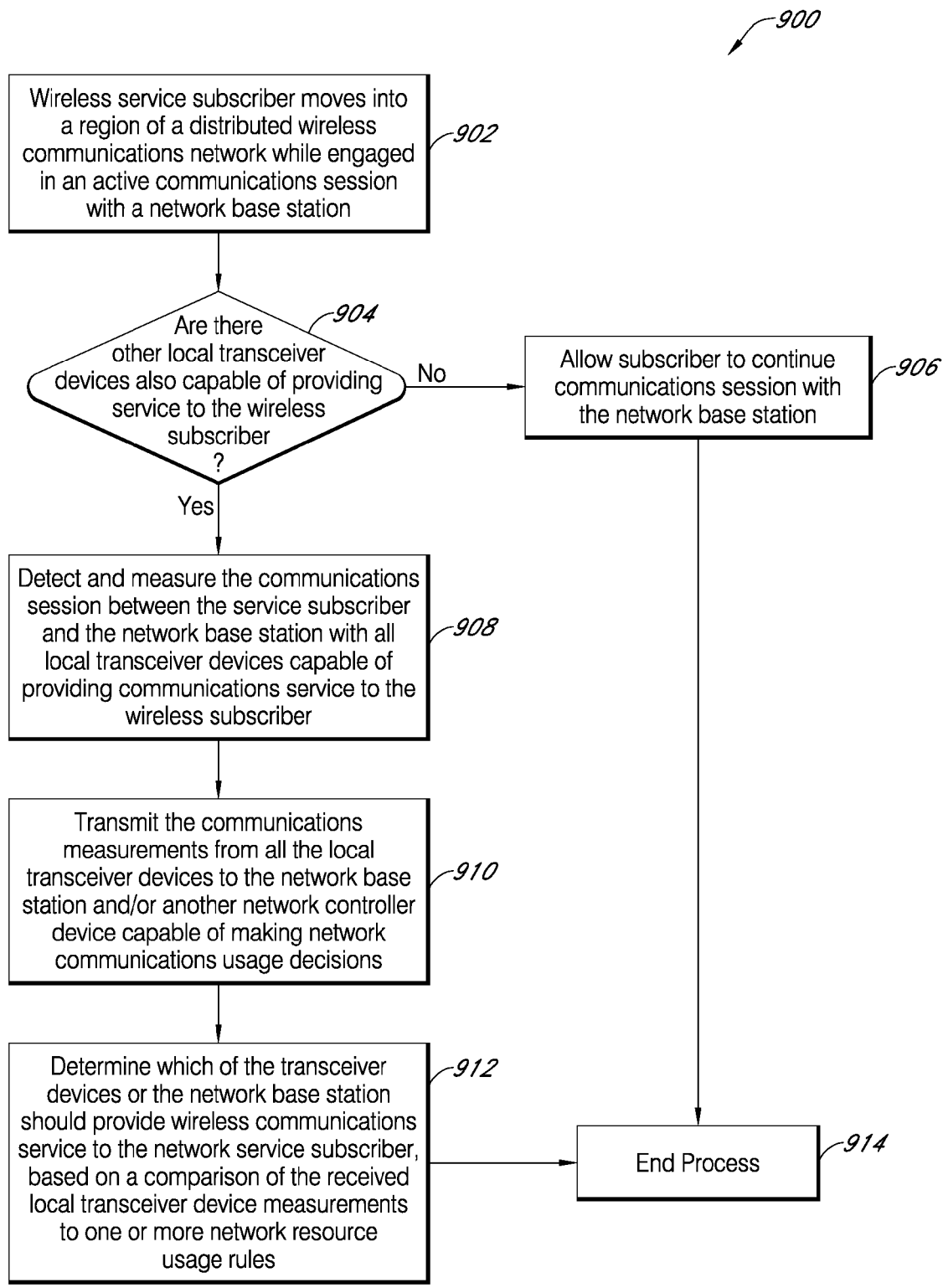
FIG. 9 illustrates a flow diagram depicting ancillary device communication detection and measurement processes associated with a particular network service subscriber in accordance with an embodiment of the present invention.

FIG. 9 illustrates a flow diagram 900 depicting ancillary communications detection, measurement, and evaluation processes associated with a particular network service subscriber in accordance with an embodiment of the present invention. It should be understood that this process 900 could be executed using one or more computer-executable programs stored on one or more computer-readable media located on any of the network computing system's 100 transceiver devices 118, 120, and 122 or collaboratively on any of the network's base station 106a-c or controller devices 110, 112 and 114 of FIG. 1 (or on any other common service provider device known the Art, such as those common to GSM, UMTS, and LTE networks). At block 902, a wireless service subscriber (e.g., a subscriber operating any of user equipment 108a-c, 124, 126a-c, 128, 130, and 132 of FIG. 1) moves into a region of a distributed wireless communications network while engaged in an active communications session with a network base station (e.g., with any of base stations 106a-b or transceiver devices 118, 120, or 122). Next at decision block 904, it is determined if there are other local transceiver devices also capable of providing service to the wireless subscriber. If there are no other local transceiver devices also capable of providing service to the wireless subscriber, then the process proceeds to block 906, where the service provider allows the subscriber to continue their communications session with the network base station. Subsequently, the process ends at block 914. However, if there are other local transceiver devices also capable of providing service to the wireless subscriber, then the process proceeds to block 908 where all local transceiver devices capable of providing communications service to the wireless subscriber independently detect and measure the communications session between the service subscriber and the network base station. Next at block 910 all the measurements made by the local transceiver device(s) are transmitted to the network base station and/or a controller device capable of making network communications usage decisions. Then the process proceeds to block 912, where it is determined which one of the transceiver devices or the network base station should provide wireless communications service to the network service subscriber, based on a comparison of the received local transceiver device measurements to one or more network resource usage rules. Subsequently, the process ends at block 914.

Figure 10:
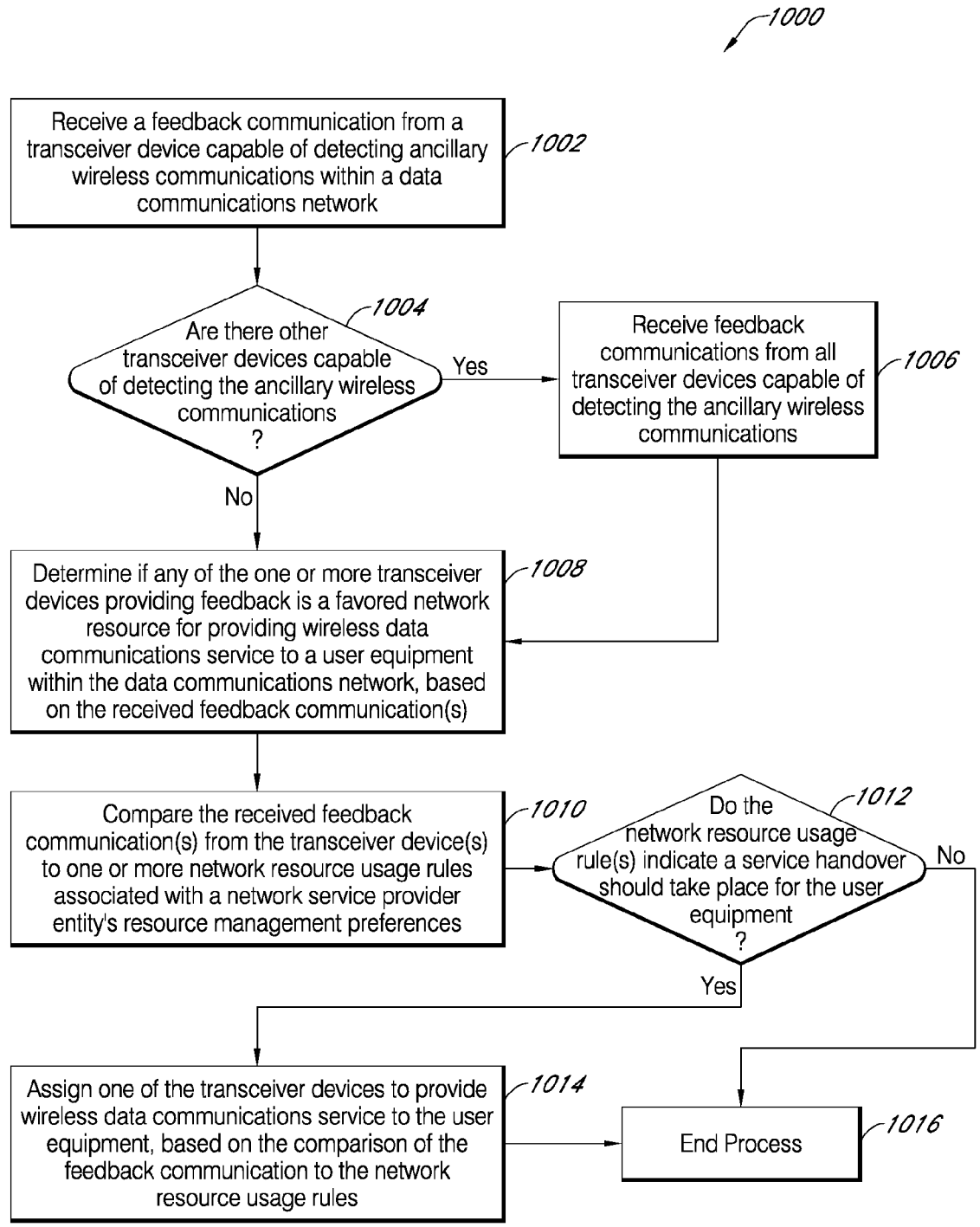
FIG. 10 illustrates a flow diagram depicting processes associated with a radio communications controller receiving cell feedback and making network assignment decisions based on the received feedback in accordance with an embodiment of the present invention.

FIG. 10 illustrates a flow diagram 1000 depicting processes associated with a radio communications controller 600 receiving cell feedback 500 and making network assignment decisions based on a comparison of the received feedback with a set of network resource usage rules in accordance with an embodiment of the present invention. It should be understood that these processes 1000 could be executed using one or more computer-executable programs stored on one or more computer-readable media located on any of the network computing system's 100 base station 106a-c or controller devices 110, 112 and 114, and/or collaboratively on any of the transceiver devices 118, 120, and 122 of FIG. 1 (or on any other common service provider device known the Art, such as those common to GSM, UMTS, and LTE networks). At block 1002, radio communications controller 600 requests feedback from a transceiver device (e.g., 118) capable of detecting ancillary wireless communications (e.g., user equipment communications with a macrocell) within a data communications network 100. Next, at decision block 1004, it is determined if there are other transceiver devices (e.g., 120 or 122) capable of detecting the ancillary wireless communications. If there are other transceiver devices capable of detecting the ancillary wireless communications, then at block 1006, the controller receives feedback communications from all transceiver devices capable of detecting the ancillary wireless communications, and then the process proceeds to block 1008. If there are no other transceiver devices capable of detecting the ancillary wireless communications then the process proceeds to block 1008, where the radio communications controller determines if any of the one or more transceiver devices providing feedback is a favored network resource for providing wireless data communications service to a user equipment within the data communications network, based on the received feedback communications.

Subsequently, the process proceeds to block 1010, where the received feedback communications from the transceiver device(s) are compared to a one or more network resource usage rules associated with a network service provider entity's resource management preferences. Then at decision block 1012 it is determined if the network resource usage rules indicate a service handover should take place for a user equipment associated with the detected ancillary communications. If it is determined that the network resource usage rules indicate a service handover should take place, then the process proceeds to block 1014, where the radio communications controller 600 assigns one of the transceiver devices to provide wireless data communications service to the user equipment, based on the comparison of the feedback communication to the network resource usage rules. Subsequently, the process ends at block 1016. If it is determined that the network resource usage rules indicate a service handover should not take place, then the process ends at block 1016.

Figure 11:
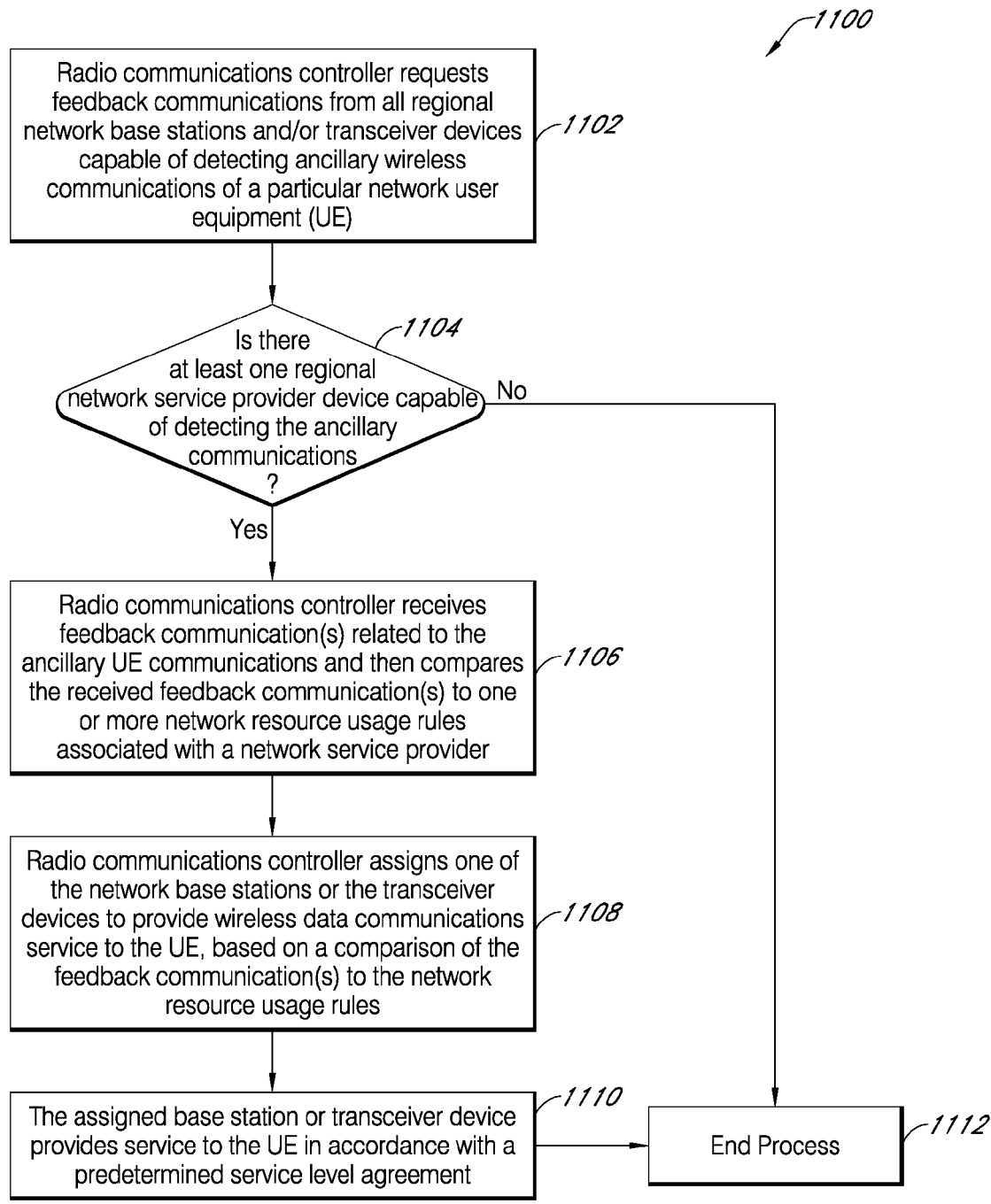
FIG. 11 illustrates a flow diagram depicting processes associated with a radio communications controller receiving requested cell feedback and making network assignment decisions based on the received feedback in accordance with an embodiment of the present invention.

FIG. 11 illustrates a flow diagram 1100 depicting processes associated with a radio communications controller 600 receiving requested cell feedback 500 and making network assignment decisions based on a comparison of the received feedback with a set of network resource usage rules in accordance with an embodiment of the present invention. It should be understood that the processes 1100 could be executed using one or more computer-executable programs stored on one or more computer-readable media located on any of the network computing system's 100 base station 106a-c or controller devices 110, 112 and 114, and/or collaboratively on any of the transceiver devices 118, 120, and 122 of FIG. 1 (or on any other common service provider device known the Art, such as those common to GSM, UMTS, and LTE networks). At block 1102, radio communications controller 600 requests feedback communications from all regional network base stations and/or transceiver devices capable of detecting ancillary wireless communications of a particular network user equipment. Next, at decision block 1102 it is determined if there is at least one regional network service provider device capable of detecting the ancillary communications. If there are none, then the process ends at block 1112.

However, if there is at least one regional network service provider device capable of detecting the ancillary communications, then the process proceeds to block 1106, where the radio communications controller 600 receives feedback communications related to the ancillary user equipment communications and then the controller compares the received feedback communications to one or more network resource usage rules associated with a particular network service provider. Next the process proceeds to block 1108, where the radio communications controller assigns one of the network base stations or transceiver devices to provide wireless data communications service to the user equipment, based on a comparison of the feedback communications to the network resource usage rules. Then at block 1110, the assigned base station or transceiver device provides service to the user equipment in accordance with a predetermined service level agreement. Subsequently, the process ends at block 1112.

In accordance with an embodiment of the invention the ancillary communications detection, measurement, and assignment processes may include at least the following processes:

1) Multiple regional radio access nodes of a radio access network are made aware of the airlink resource usage of neighboring radio access nodes within the network;
2) The radio access nodes then may scan the random access channel (RACH) resources of their neighboring radio access nodes;
3) When a radio access node receives a RACH transmission from a user equipment it may make an inquiry to its neighboring radio access nodes to see if any of them detected the RACH as well;

4) The radio access nodes that detected the RACH burst of inquiry can communicate their status as potential alternative serving cells to the inquiring radio access node;

5) Determinations may then be made as to the suitability of the potential alternative serving cells which may involve the user equipment making specific measurements and/or "probing" one or more of the candidate radio access nodes;

6) If a potential alternate serving cell is found to be the most suitable of the candidates, then a connection with the subscriber device may be established with this radio access node rather than the original target radio access node; and 7) If no potential alternate serving cell is found to be suitable, then the subscriber device may establish a connection with the original target radio access node.

In accordance with various disclosed embodiments of the present invention, smaller network cells may assist larger network cells in shifting network load towards the smaller cells, thereby reducing loads on larger network cells and increasing overall network capacity. While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for assigning regional wireless communications based on user equipment feedback, the system comprising:
   a radio communications controller;
   a base station defining a first coverage area;
   first and second transceiver devices defining second and third coverage areas, respectively, the second and third coverage areas being provided within the first coverage area;
   a user equipment; and
   a data communications network facilitating data communications amongst wireless communications devices of the networked computing system,
   wherein the radio communications controller is configured to:
   register the user equipment to the first coverage area of the base station while the user equipment is at a first location within the first coverage area;
   maintain the user equipment's registration with the first coverage area as the user equipment moves to a second location within the first coverage area, the second location being within the second coverage area, the user equipment being at an idle mode as the user equipment moves to the second location in the second coverage area;
   receive a first feedback communication from the first transceiver device that detects a service request being transmitted to the base station by the user equipment, the first feedback communication providing an indication of a signal quality of the service request as detected by the first transceiver device with understanding that the service request is directed to the base station;
   transmit a first request to the user equipment to make a measurement of a wireless resource of the first transceiver device after receiving the feedback communication from the first transceiver device,
   wherein the first feedback communication comprises measured characteristics associated with an ancillary communications session between the user equipment and a network base station.

2. The networked computing system of claim 1, wherein the second location is within the first, second, and third coverage areas, and wherein the radio communications controller is further configured to:
   receive a second feedback communication from the second transceiver device that detects the service request being transmitted to the base station by the user equipment, the second feedback communication providing an indication of a signal quality of the service request as detected by the second transceiver device with understanding that the service request is directed to the base station;
   transmit a second request to the user equipment to make a measurement of a wireless resource of the second transceiver device after receiving the second feedback communication from the second transceiver device; and
   determine whether the first transceiver device or the second transceiver device is a favored alternate service provider resource for providing wireless data communications service to the user equipment.

3. The networked computing system of claim 1, wherein first transceiver device is a microcell, a picocell, or a femtocell device, and wherein the radio communications controller is further configured to:
   assign the first transceiver device to provide wireless data communications service to the user equipment, based on the comparison of the feedback communication to the network resource usage rules.

4. The networked computing system of claim 1, wherein the first feedback communication comprises measured characteristics associated with an ancillary communications session between the user equipment and a network base station, and
   wherein the radio communications controller is further configured to:
   determine whether a wireless resource of the first transceiver device is to be used to process the service request of the user equipment.

5. A non-transitory computer-readable medium encoded with computer-executable instructions for assigning regional wireless communications for a networked computing system having a base station defining a first coverage area and a first transceiver device defining a second coverage area that is provided entirely within the first coverage area, the computer-executable instructions comprising:
   code for registering a user equipment to the first coverage area of the base station while the user equipment is at a first location within the first coverage area;
   code for maintaining the user equipment's registration with the first coverage area as the user equipment moves to a second location within the first coverage area, the second location being within the second coverage area, the user equipment being at an idle mode as the user equipment moves to the second location in the second coverage area;
   code for receiving a first feedback communication from the first transceiver device that detects a service request being transmitted to the base station by the user equipment, the first feedback communication providing an indication of a signal quality of the service request as detected by the first transceiver device with understanding that the service request is directed to the base station; and
   code for transmitting a first request to the user equipment to make a measurement of a wireless resource of the first transceiver device after receiving the feedback communication from the first transceiver device, wherein the first feedback communication comprises measure characteristics associated with an ancillary communications session between the user equipment and a network base station.

6. The computer-readable medium of claim 5, wherein the networked computing system further includes a second transceiver device defining a third coverage area that is provided entirely within the first coverage area, the computer-executable instructions further comprising:
   code for receiving a second feedback communication from the second transceiver device that detects the service request being transmitted to the base station by the user equipment, the second feedback communication providing an indication of a signal quality of the service request as detected by the second transceiver device with understanding that the service request is directed to the base station;
   code for transmitting a second request to the user equipment to make a measurement of a wireless resource of the second transceiver device after receiving the second feedback communication from the second transceiver device; and
   code for determining whether the first transceiver device or the second transceiver device is a favored alternate service provider resource for providing wireless data communications service to the user equipment.

7. The computer-readable medium of claim 5, wherein first transceiver device is a microcell, a picocell, and a femtocell device, or wherein the method further comprises:
   code for assigning the first transceiver device to provide wireless data communications service to the user equipment, based on the comparison of the feedback communication to the network resource usage rules.

8. The computer-readable medium of claim 5, the computer-executable instructions further comprising:
   code for determining whether a wireless resource of the first transceiver device is to be used to process the service request of the user equipment, and
   wherein the first feedback communication comprises measured characteristics associated with an ancillary communications session between the user equipment and a network base station.

9. A computer-implemented method for assigning regional wireless communications based on user equipment feedback, the method comprising:
   providing a first coverage area defined by a base station and a second coverage area defined by a first transceiver device, the second coverage area being within the first coverage area;
   registering a user equipment to the first coverage area of the base station while the user equipment is at a first location within the first coverage area;
   maintaining the user equipment's registration with the first coverage area as the user equipment moves to a second location within the first coverage area, the second location being within the second coverage area, the user equipment being at an idle mode as the user equipment moves to the second location in the second coverage area;
   receiving at the base station a service request from the user equipment after the user equipment wakes up from the idle mode while in the second coverage area;
   receiving a first feedback communication from the first transceiver device that detects the service request being transmitted to the base station by the user equipment, the first feedback communication providing an indication of a signal quality of the service request as detected by the first transceiver device with understanding that the service request is directed to the base station; and
   transmitting a first request to the user equipment to make a measurement of a wireless resource of the first transceiver device after receiving the feedback communication from the first transceiver device,
   wherein the first feedback communication comprises measured characteristics associated with an ancillary communications session between the user equipment and a network base station.

10. The computer-implemented method of claim 9, wherein the second location is within the first, second, and third coverage areas, the method further comprising:
    receiving a second feedback communication from a second transceiver device that detects the service request being transmitted to the base station by the user equipment, the second feedback communication providing an indication of a signal quality of the service request as detected by the second transceiver device with understanding that the service request is directed to the base station, the second transceiver device defining a third coverage area that is provided within the first coverage area;
    transmitting a second request to the user equipment to make a measurement of a wireless resource of the second transceiver device after receiving the second feedback communication from the second transceiver device; and
    determining whether the first transceiver device or the second transceiver device is a favored alternate service provider resource for providing wireless data communications service to the user equipment.

11. The computer-implemented method of claim 9, wherein first transceiver device is a microcell, a picocell, or a femtocell device, and wherein the method further comprises:
    assigning the first transceiver device to provide wireless data communications service to the user equipment, based on the comparison of the feedback communication to the one or more network resource usage rules.

12. The computer-implemented method of claim 9, further comprising:
    determining whether a wireless resource of the first transceiver device is to be used to process the service request of the user equipment,
    wherein the first feedback communication comprises measured characteristics associated with an ancillary communications session between the user equipment and a network base station.

13. A radio communications controller device for assigning regional wireless communications based on user equipment feedback, the radio communication controller provided as part of a networked computing system having a base station defining a first coverage area and a transceiver device defining a second coverage area that is provided within the first coverage area, the radio communications controller device comprising:
    at least one memory;
    at least one processor; and
    a data communications component,
    wherein the radio communications controller device is configured to:
    register the user equipment to the first coverage area of the first base station while the user equipment is at a first location within the first coverage area;
    maintain the user equipment's registration with the first coverage area as the user equipment moves to a second location within the first coverage area, the second location being within the second coverage area, the user equipment being at an idle mode as the user equipment moves to the second location in the second coverage area;

receive a first feedback communication from the first transceiver device that detects the service request being transmitted to the base station by the user equipment, the first feedback communication providing an indication of a signal quality of the service request as detected by the first transceiver device with understanding that the service request is directed to the base station; and transmit a first request to the user equipment to make a measurement of a wireless resource of the first transceiver device after receiving the feedback communication from the first transceiver device, wherein the first feedback communication comprises measured characteristics associated with an ancillary communications session between the user equipment and a network base station.

14. The radio communications controller of claim 13, wherein the networked computing system further includes a second transceiver device defining a third coverage area that is provided within the first coverage area and the second location is within the first, second, and third coverage areas, the radio communications controller is further configured to:

receive a second feedback communication from the second transceiver device that detects the service request being transmitted to the base station by the user equipment, the second feedback communication providing an indication of a signal quality of the service request as detected by the second transceiver device with understanding that the service request is directed to the base station;

transmit a second request to the user equipment to make a measurement of a wireless resource of the second transceiver device after receiving the second feedback communication from the second transceiver device; and determine whether the first transceiver device or the second transceiver device is a favored alternate service provider resource for providing wireless data communications service to the user equipment.

15. The radio communications controller of claim 13, wherein the radio communication controller is part of the base station, and wherein the radio communications controller is further configured to:

receive the service request from the user equipment after the user equipment wakes up from the idle mode while in the second coverage area.

16. The radio communications controller of claim 13, wherein the radio communications controller is further configured to determine whether a wireless resource of the first transceiver device is to be used to process the service request of the user equipment, wherein the first feedback communication comprises measured characteristics associated with an ancillary communications session between the user equipment and a network base station.

* * * * *